(12) United States Patent
Shives et al.

(10) Patent No.: US 7,170,941 B2
(45) Date of Patent: Jan. 30, 2007

(54) TEMPORAL COMPRESSION

(75) Inventors: Michael Shives, Smithsburg, MD (US); Walter Staruk, MiddleTown, MD (US)

(73) Assignee: Patapsco Designs Inc., Frederick, MD (US)

( * ) Notice: Subject to any disclaimer, the term of this patent is extended or adjusted under 35 U.S.C. 154(b) by 610 days.

(21) Appl. No.: 10/155,966

(22) Filed: May 29, 2002

(65) Prior Publication Data

US 2005/0063464 A1    Mar. 24, 2005

Related U.S. Application Data (63) Continuation of application No. 09/637,641, filed on Aug. 14, 2000, now abandoned.

(60) Provisional application No. 60/148,594, filed on Aug. 13, 1999.

(51) Int. Cl.
H04B 1/66 (2006.01)

(52) U.S. Cl. .......... 375/240.12; 375/240.16; 375/240.25; 375/240.14; 375/240.03; 375/240.26; 348/699; 382/238; 382/251; 382/233; 382/235; 382/239

(58) Field of Classification Search .......... 375/240.12, 375/240.14, 240.16, 240.03, 240.01, 240.25, 375/240.26; 348/699; 382/236, 238, 233, 382/240, 251, 235, 239
See application file for complete search history.

(56) References Cited

U.S. PATENT DOCUMENTS

| 4,755,870 | A | * | 7/1988 | Markle et al. .......... 348/34 |
| 5,509,089 | A | * | 4/1996 | Ghoshal .......... 382/236 |
| 5,512,946 | A | * | 4/1996 | Murata et al. .......... 348/222.1 |
| 5,737,448 | A | * | 4/1998 | Gardos .......... 382/240 |
| 5,825,421 | A | * | 10/1998 | Tan .......... 375/240.15 |
| 5,896,176 | A | * | 4/1999 | Das et al. .......... 375/240.15 |
| 5,991,448 | A | | 11/1999 | Go |
| 6,205,256 | B1 | | 3/2001 | Chaddha |
| 6,266,370 | B1 | | 7/2001 | Kamikura et al. |
| 6,295,376 | B1 | | 9/2001 | Nakaya |
| 6,307,971 | B1 | * | 10/2001 | Persiantsev et al. .......... 382/236 |
| 6,310,963 | B1 | | 10/2001 | Erdol et al. |
| 6,532,265 | B1 | * | 3/2003 | Van der Auwera et al. .......... 375/240.16 |
| 2001/0014125 | A1 | | 8/2001 | Endo |
| 2001/0016005 | A1 | | 8/2001 | Kamikura et al. |
| 2001/0016078 | A1 | | 8/2001 | Go |
| 2001/0017941 | A1 | | 8/2001 | Chaddha |

(Continued)

OTHER PUBLICATIONS

Michael L. Hinton, et al., "Compressing Still And Moving Images with Wavelets", Multimedia Systems, vol. 2, No. 5, Dec. 1994, pp. (1-19) 218-227.

(Continued)

Primary Examiner—Shawn S. An
(74) Attorney, Agent, or Firm—Banner & Witcoff, Ltd.

(57) ABSTRACT

The present invention discloses a temporal compressor and decompressor for sequences of images. The compressor includes an interface for receiving the sequence of images. A spatial compressor generates spatially compressed image fields from the sequence of images, a data compression decoder generates data decompressed image fields from the spatially compressed image fields, a temporal processor generates temporal processed image fields from the data decompressed image fields, a data compressor encoder generates data compressed image fields from the temporal processed image fields, and a data formatter generates formatted compressed image fields.

46 Claims, 7 Drawing Sheets

U.S. PATENT DOCUMENTS

2001/0041011 A1    11/2001    Passaggio et al.
2002/0030740 A1    3/2002    Arazi et al.
2002/0131505 A1    9/2002    Vidunas
2003/0174776 A1*    9/2003    Shimizu et al. ........ 375/240.16

OTHER PUBLICATIONS

Robi Polikar, "the Wavelet Tutorial Part I", printed from http://www.public.iastate.edu/~rpolikar/WAVELETS/Wtpartl.html.

Rich Greene, "Using ADVJP2000", Analog Devices, AN-576, Application Note, REV. Pro, pp. 1-12.

Application of Multiscale Characterization of Edges to Motion Determination, IEEE Transactions on Signal Processing, vol. 46, No. 4, Apr. 1998; pp. 1174-1179.

Wavelet Coefficients Motion Compensation for Image Sequence Endocing IEEE Asia-Pacific Conference on Circuits and Systems, 1998; pp. 53-56.

Wavelet Transforms for Use in Motion Detection and Tracking Application; International conference on Image Processing and its Application; 1999, vol. 2; pp. 711-715.

Hakan CIVI. ADPCM Coding Experiments-1; Analog Devices, Inc. Jan. 15, 1998.

Analog Devices, Inc. Ultralow Cost Video Codec; ADV601LC Data Sheet; 1999.

* cited by examiner

TEMPORAL COMPRESSION

CROSS-REFERENCE TO RELATED APPLICATIONS

This is a continuation of and claims priority to U.S. application Ser. No. 09/637,641, filed on Aug. 14, 2000, now abandoned which claims priority to and incorporates by reference provisional application Ser. No. 60/148,594, filed on Aug. 13, 1999, entitled "Temporal Compression in a Video Compression Unit for a Camera Surveillance System." The aforementioned provisional application is hereby incorporated by reference.

FIELD OF THE INVENTION

This invention relates generally to the field of temporal video compression, and more particularly to temporal image compression for image sequences.

BACKGROUND OF THE INVENTION

Sequences of pictures may occupy vast amounts of storage space when represented in digital form. For example, suppose pictures in a sequence are digitized as discrete fields with 360 picture elements/horizontal line and 243 lines/field. Assuming the picture sequence is in color, a three-color separation may be used for each picture. If each color component is sampled at a 360×243 resolution with 8-bit/component precision, each picture could occupy approximately 262 Kbytes. If the moving pictures are sent uncompressed at 60 pictures per second, the raw data rate for the sequence may be about 126 Mbits/second. A one-minute video clip could occupy about 945 Mbytes.

Consider a point-of-sale surveillance system that may need to store sixty days' or more worth of data for later retrieval and display. Such a system may have a multitude of color video sources as well as other related data to store. If such a system had 32 color cameras, then it may require over 2.6 Peta bytes (or over 35,600 73 Gbyte disc drives) to store 60 days of data.

Analog Devices of Norwood, MA offers an IC chip product that will perform lossy spatial compression on individual camera fields for the purpose of reducing the amount of data needed to represent each discrete image. Also, they suggested that if further compression is needed for surveillance purposes, then further techniques to increase compression may need to be developed. They performed a software experiment whose results where documented on Jan. 15, 1998 and titled "ADPCM Coding Experiment-I" by Hakan Civi. This experiment is said to have employed basic pixel subtraction to determine the difference between two successive fields along with some kind of reconstructed-field feedback mechanism to deal with rounding in their pixel calculations (note: the Analog Devices document is not specific as to the details of the algorithm that was used, but the above described basics of their ADPCM approach were gleaned from conversations with Analog Devices). The Analog Devices' experiment was a software-only endeavor, and did not achieve the dramatic temporal compression results that were needed.

What is needed is a way to more efficiently compress a multitude of video signals real-time so that systems such as retail store surveillance systems may store the video signals for future retrieval at a reasonable system size and cost.

BRIEF SUMMARY OF THE INVENTION

One advantage of this invention is that it effectively and efficiently reduces field-to-field redundancies in an image sequence in areas of an image where there is little or no motion to record. While not significantly degrading the overall picture quality, this invention does dramatically reduce the data storage requirements for the image sequences.

A further advantage of the invention is that it reduces low-level image noise by performing a clipping function on higher-than-normal precision difference fields and includes a divide, truncate, and multiply function. This unique noise reduction function is one of the main keys to the effectiveness of this invention.

Another advantage of this invention is the inherent, low noise, motion detection capability that it provides as a byproduct of the temporal process. This motion detection capability can be applied to specific areas of the image and is extremely useful for surveillance applications.

To achieve the foregoing and other advantages, in accordance with all of the invention as embodied and broadly described herein, a temporal compressor for compressing sequences of images is provided. The compressor includes an interface for receiving the sequence of images. A spatial compressor generates spatially compressed image fields from the sequence of images, a data compression decoder generates data decompressed image fields from the spatially compressed image fields, a temporal processor generates temporal processed image fields from the data decompressed image fields, a data compression encoder generates data compressed image fields from the temporal processed image fields, and a data formatter generates formatted compressed image fields.

In yet a further aspect of the invention, a method for temporal decompression of a sequence of compressed images comprises the steps of: generating data decompressed image fields from the sequence of compressed images; generating inverse temporal processed image fields from the data decompressed image fields; generating inverse quantized image fields from the temporal decompressed image fields; generating inverse spatially transformed image fields from the inverse quantized image fields; and generating fully decompressed image fields from the inverse spatially transformed image fields.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention provides a temporal compressor and decompressor. The temporal compressor reduces field-to-field redundancies in an image sequence in areas of the image where there may be little or no motion to record. The temporal decompressor reconstructs the original image sequence from a compressed image sequence compressed using the temporal compressor. Of the various kinds of image sequences, surveillance video is a good example of an image sequence that may be very temporally compressible since typically only a small percentage of the picture is moving, and often there may be no movement at all. On average, it has been observed that maybe only about 10% to 20% of the picture is moving at about 20% to 30% of the time.

Figure 1:
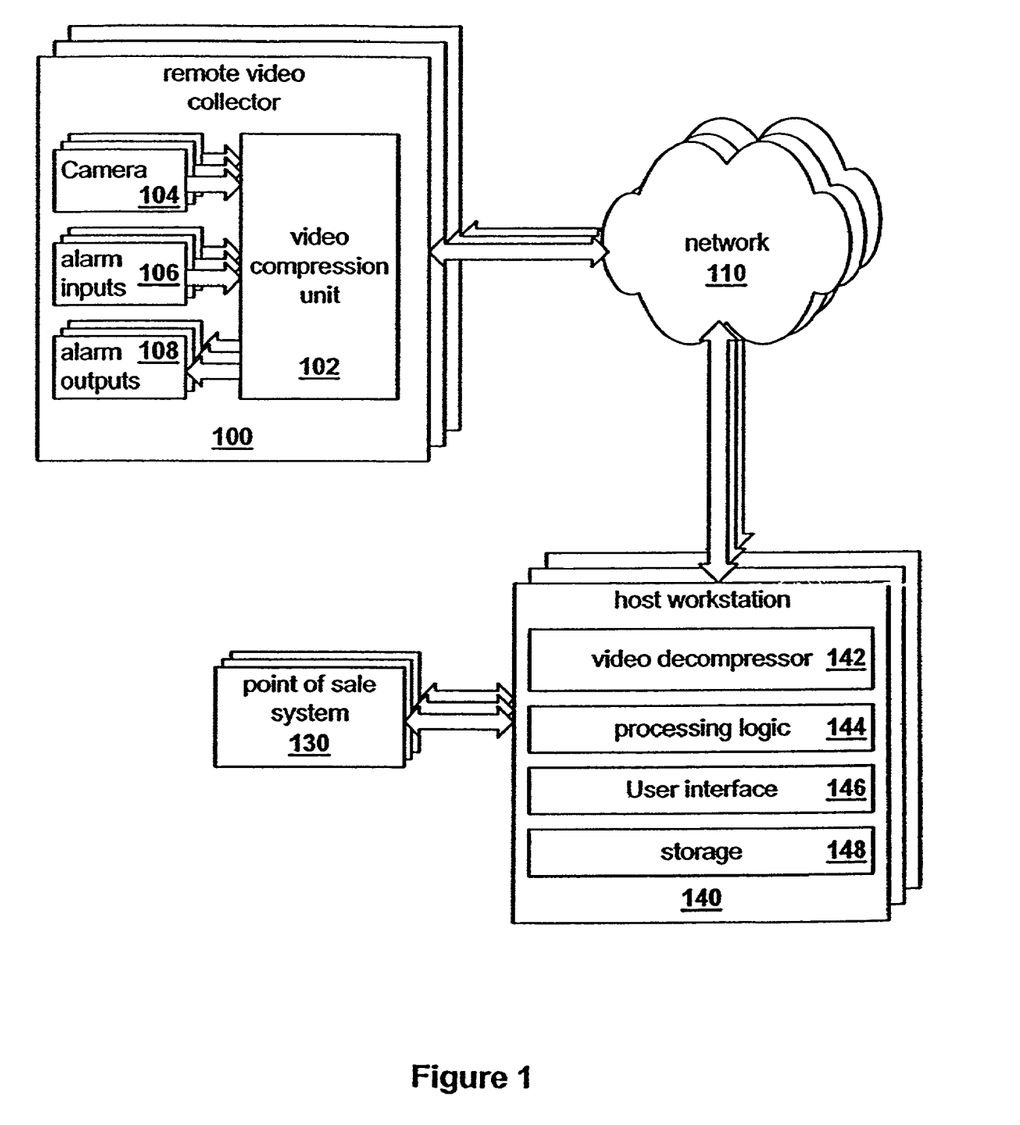
FIG. 1 is a block diagram showing a surveillance system using temporal compression as per an embodiment of the present invention.

FIG. 1 is a block diagram showing a surveillance system using temporal compression as per an embodiment of the present invention. The surveillance system may have a multitude of remote video collectors 100 and a multitude of host workstations 140 interconnected by a network 110. The network 110 may be any type of network including Ethernet, point to point wiring, and Internet. The network 110 may even be a combination of networks, where for example, an isolated high bandwidth network may be used to carry video streams and another network may be used to transport general data. The remote video collector(s) 100 may include a video compression unit 102, cameras 104, alarm inputs 106, and alarm outputs 108. The remote video collector(s) 100 may receive and process video data from the cameras 104, collect data from the alarm inputs 106, set the alarm outputs 108, and communicate over the network 110 with host workstation(s) 140.

The host workstations 140 may further include a video decompressor 142, processing logic 144, a user interface 146, and image storage devices 148 such as hard drives or optical drives. The host workstations 140 may also interface with point of sale systems 130, where it may be desirable to link compressed video storage to point of sale data.

Figure 2:
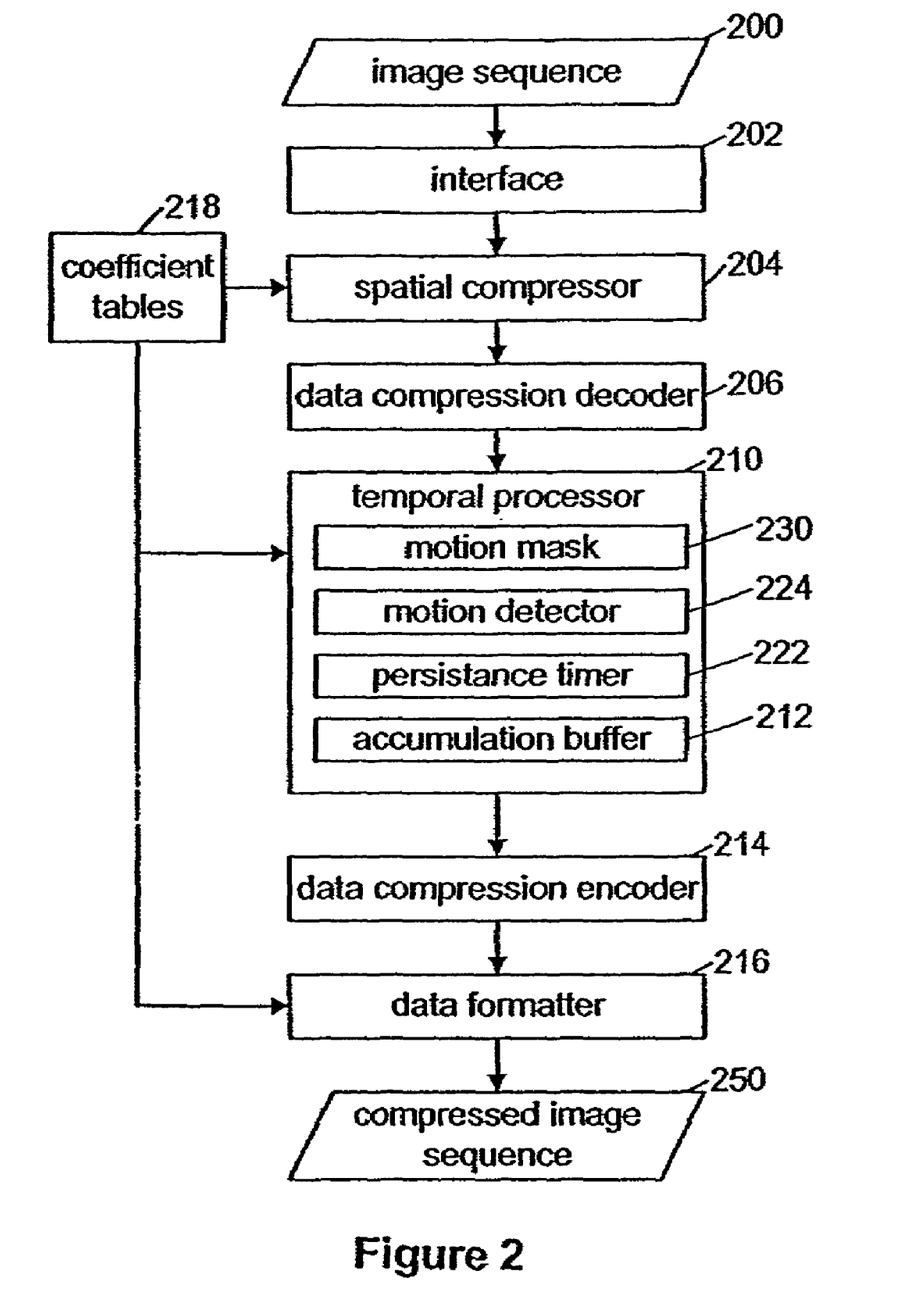
FIG. 2 is a block diagram of a temporal compression apparatus as per an embodiment of the present invention.
Figure 3:
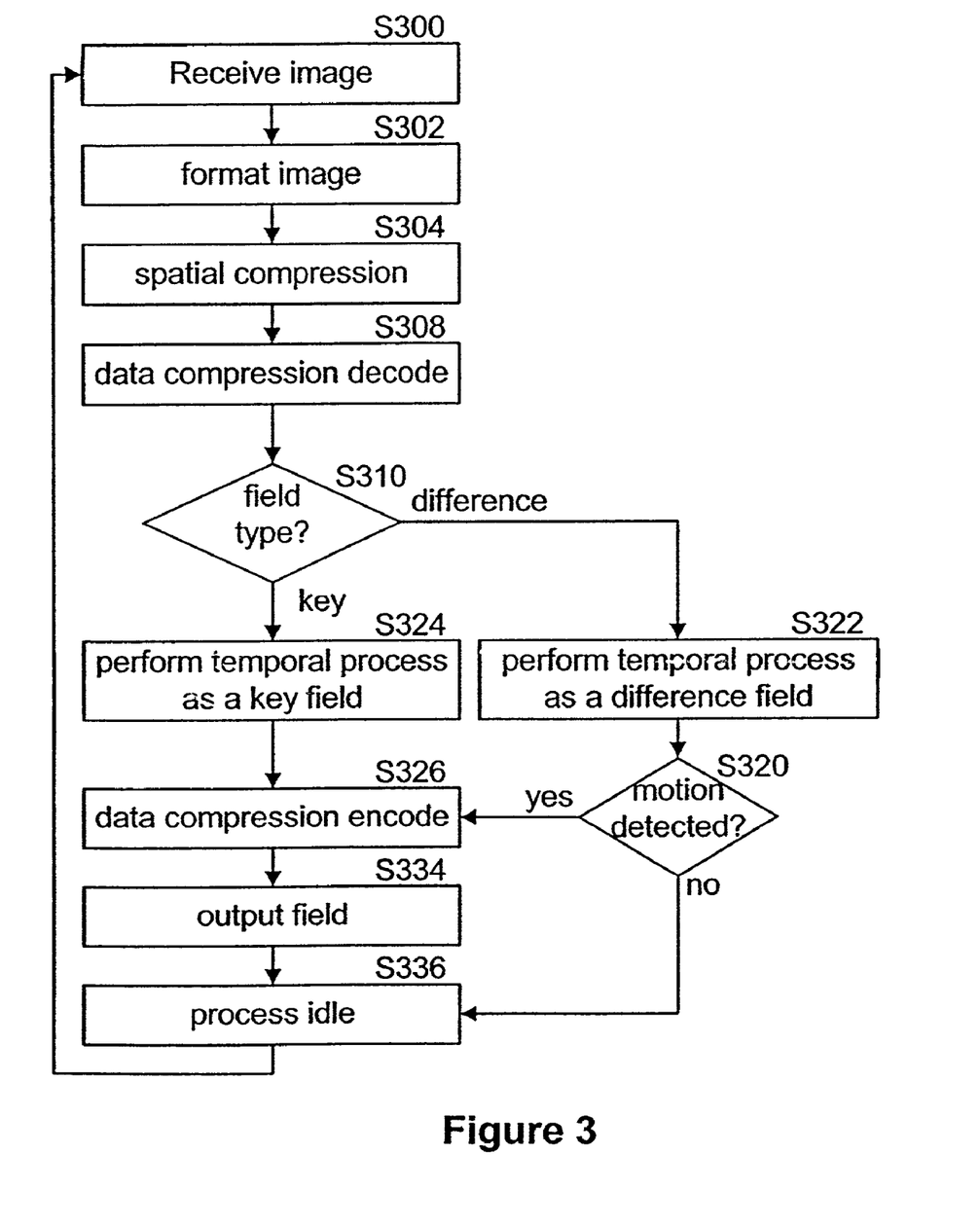
FIG. 3 is a flow diagram of temporal compression as per an embodiment of the present invention.
Figure 4:
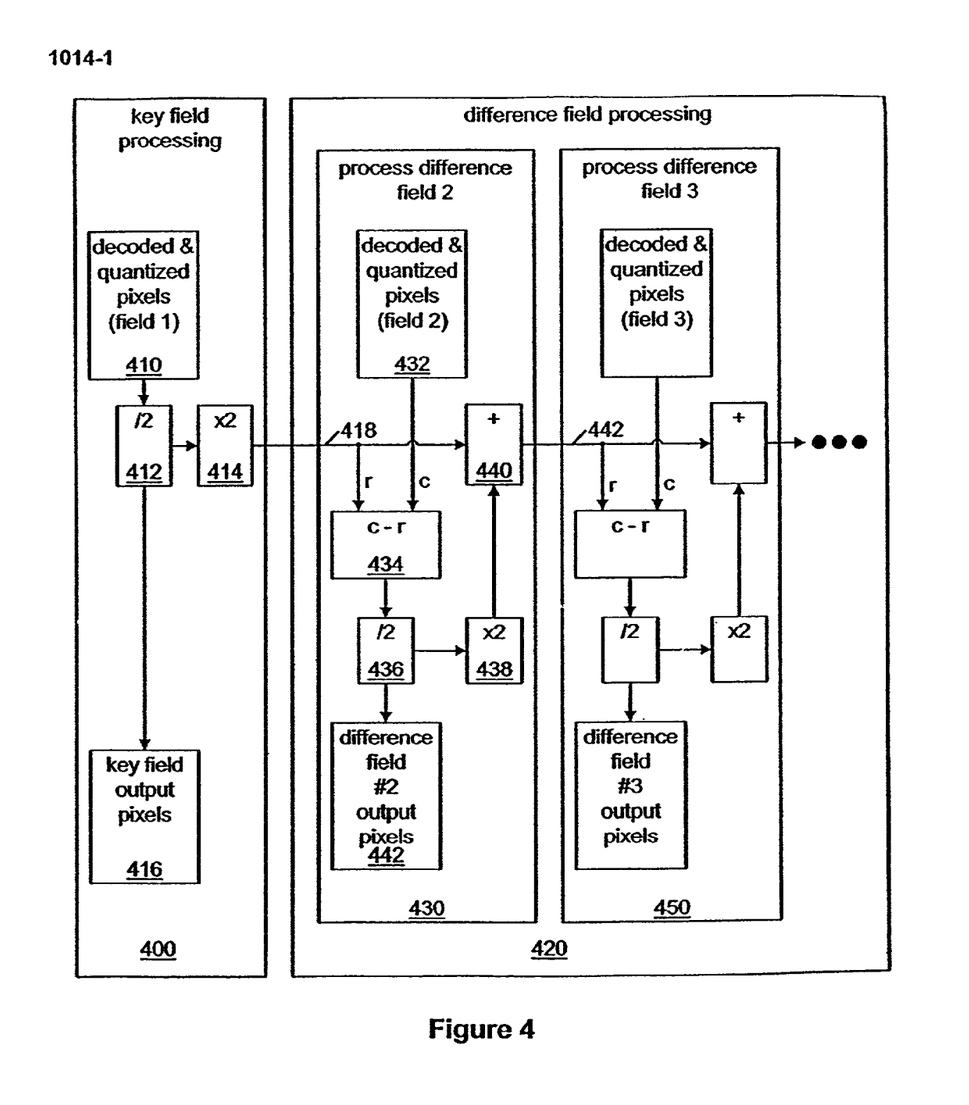
FIG. 4 is a block diagram of temporal field processing as per an embodiment of the present invention.

FIGS. 2, 3 and 4 show an embodiment of a temporal compressor. FIG. 2 is a temporal compression apparatus block diagram as per an embodiment of the present invention, FIG. 3 is a flow diagram of temporal compression as per an embodiment of the present invention, and FIG. 4 is a block diagram of temporal field processing as per an embodiment of the present invention.

An interface 202 may receive (S300), convert and format (S302) image sequences 200 into a compatible form for processing. The image sequences 200 may be any type of image sequence including both digital and analog image sequences. If for example, the images are analog images, then the interface 202 may need to digitize the images and format them into a compatible digital format.

Temporal compression as per the present invention may generally be performed on a field-by-field basis at a rate that is less than the full video field rate (60 fields/sec). A normal field rate may be 3.75 fields/sec for a typical retail store application; however, greater field rates may be used for other applications. If other field rates are desired for use with NTSC video sources, it may be convenient for them to be an even division into 60 fields/sec. This may ensure that only "even" or "odd" fields are used from the interlaced NTSC video source. This may be important for temporal processing to be effective due to undesired differences between odd and even fields that may result in a false motion indication.

In the current embodiment for performing temporal compression, every camera may have a compression circuit consisting of an initial spatial compression stage 204 followed by a digital signal processor, which may include a secondary temporal processor 210. In other embodiments, the spatial processor and digital signal processor may be replaced by other devices including a computer and software.

The spatial compressor 204 may generate spatially compressed image fields (S304) from the image sequences 200, which were received (S300) and processed (S302) by interface 202. The spatial compressor 204 may utilize a device such as the ADV601 LC compression IC manufactured by Analog Devices of Norwood, Mass. for each separate field of video in an effort to reduce any redundant features within the field (S304).

The spatial compressor 204 may input and process (S304) one digitized video field at a time. The field may first be run through a series of digital filters to perform a bi-orthogonal wavelet transform on the black & white (luminance) and color (chrominance) components of the field. The output of the wavelet transform may consist of a multitude of different "versions" of the original picture field which are sub-bands called mallat blocks (14 luminance blocks and 28 chrominance blocks). Each of these mallat blocks may contain different information about the entire picture, and each block may have a different (yet fixed) number of "pixels".

Using even (or odd) fields, this embodiment may yield a vertical resolution of 243 pixels. Additionally, the horizontal resolution may be 360 pixels. It may be possible to obtain a horizontal resolution of 720 pixels, but it has been advised and observed that most NITSC cameras and signals can only yield around 360 pixels. Consequently, there may be no gain realized in using the device's full capability for this embodiment. Therefore, the three largest mallat blocks (0, 1, and 2) may not need to be used, which should save substantial processing time. The 360×243 pixel resolution has been demonstrated and proved adequate for the task of observing employee theft. Other embodiments however, may need higher resolutions and thus use more of the device's capability. For example, even and odd fields can be combined to form a total vertical resolution of 486 pixels.

So far, no significant picture information may have been lost and no compression may have occurred. At this point, these mallat block pixels may contain 16 bits of precision, which is necessary to fully reproduce the original picture. However, if a lesser quality picture is acceptable, then these pixel values may be scaled down by multiplying them by a fraction called a "reciprocal bin width". This process may be called quantization and may reduce the pixel values to a point where they may be effectively compressed using a data compression encoder. The presently illustrated embodiment may use Huffman and runlength encoding; however, any type of data compressor could be used including other entropy or arithmetic coding techniques.

It is important to note that the Huffman and runlength encoding may need to be reversed (decoded) before any temporal processing may occur on the quantized pixel data.

This data compression decoding (S308) occurs in the presently illustrated embodiment by the data compression decoder 206. It may be possible to eliminate this step if a spatial compressor 204 is utilized that does not perform data compression encoding.

The 42 reciprocal bin widths (fractional pixel multipliers used during compression) and 42 bin widths (pixel multipliers used during decompression) may be user definable variables that directly control how much information is thrown away in the picture. These 2 variable types may enable the user to adjust the amount of picture quality degradation that is acceptable in order to achieve an optimal spatial compression ratio for a given application. Coefficient tables 218 may be used to store these values.

Preliminary sets of fixed bin widths and reciprocal bin widths have been experimentally determined as providing acceptable levels of wavelet compression artifacts for retail store surveillance applications. These fixed binwidth values may yield a spatial compression ratio of around 27:1 (if 16 bit, 720 horizontal pixel resolution video may be considered a starting point) or more realistically, around 14:1 (if 16 bit, 360 horizontal resolution is considered the starting point). When temporal processing is added using the temporal processor 210, the effective overall compression may go up by about a multiplier of about 5 when there is only 20% of the picture moving. Also, ideally the compression goes up another multiplier of about 5 when there is only motion 20% of the time. However, these ideal numbers are dependent on the effectiveness of the spatial and temporal processing to deal with various types of video motion and video imperfections such as noise. For example, a motion detector 224 may be added to the temporal processor 210 to help approach the performance goal when there is motion 20% of the time.

The temporal processor 210 as practiced by the current invention generally involves outputting differences between any two successive image fields. Initially, a determination is made as to what kind of field type the image field is to be at step S310. A complete image field may be sent out once every minute. This field is called a key field and its output interval may vary widely among other types of temporal compression. It should be noted that this one-minute interval was chosen for this particular embodiment to prevent mass storage memory space from being excessively large for the key fields (as compared to the memory space for the difference fields); however, one skilled in the art will recognize that other values may be used. Following each key field, a series of difference fields (224 in the present embodiment) may be sent out during the rest of that minute at a nominal field rate of 3.75 fields/second (or other rates as previously outlined). Each difference field output 442 may be a compressed version of the differences between the current field 432 and the previous feedback-adjusted field 418 (this feedback-adjusted field may be referred to as an accumulated field). These fields may be stored in an accumulation buffer 212. Rebuilding the original video sequence may simply involve a progression of decompressing the key field and each difference field and then adding them together from the beginning to the end of a one-minute sequence. A uniqueness of this implementation of temporal compression involves the manner in which the field differencing is performed, especially in conjunction with the use of wavelet spatial compression, which may be performed by some embodiments of the spatial compressor 204.

Simple field differencing (subtraction) alone may provide only moderate temporal processing results. However, a great deal of the information in the difference fields may be simply low level, signal and quantization noise. An embodiment of the present invention minimizes this noise without losing much of the real picture information. Research and analysis determined that the most significant portion of the noise originated from video noise and analog□to□digital quantization errors that were exaggerated by the quantization performed by the reciprocal bin width multipliers. Therefore, the overall quantization errors may be reduced by about a factor of 2 when the reciprocal binwidth fractions are increased by a factor of around 2 (which is one half the amount of quantization). Since this "less quantized" number may have one half of the noise amplitude and twice the numerical precision, a less quantized number may provide the needed minimization of quantization and rounding noise to perform significantly better temporal processing. Also, the factor of 2 may be chosen to provide more processing efficiency for necessary binary multiplication and division in the DSP temporal algorithm; however, other values may also be used to generate the above-described results. Temporal processing in this higher precision environment (reciprocal binwidths set to twice the needed values) is a unique aspect of the present inventions temporal compression.

With the availability of pixel information preferably containing half of the quantization noise and twice the precision, the noise may then be more effectively clipped or truncated from the least significant part of the pixel data without dramatically affecting the useful detail of the field image. Consequently, a key to effective temporal processing with this invention may lie in the particular way in which the noise is clipped and useful data is manipulated. It is important to note that since pixel data is preferably at twice the desired precision, the data may be divided by 2 somewhere in the process before it is recompressed. One simple method of clipping is to simply drop the least significant bit of the current field's pixel data (by dividing by 2) before it is differenced (subtracted) from the last clipped field. This may be termed "input clipping" and may result in a moderate level of compression towards desired compression goals.

A more effective core temporal compression technique may involve clipping (dividing by 2) 436 only the results of the field differencing 434 and then feeding these results back to the next differencing interval. Additionally, a key to making this technique work may also be to perform the differencing using the high precision pixel values of the current input field along with the fully reconstructed image pixel values of a previous field. Using a reconstructed field (418 & 442) as the previous field in the differencing insures that lost information (during the clipping) may be fed back to the next differencing operation and taken into full account. With this feedback, the final reconstructed video sequence may significantly reduce residual noise and motion pixels that accumulate in the picture. The "difference clipping" and "reconstructed image feedback" provide a sort of hysteresis (of about 2 higher precision counts), which may help to reduce pixel fluttering due to noise around an otherwise stable value (such as may correspond to a pixel of a stationary background object). The way in which the present invention is performing "reconstructed image feedback" in conjunction with higher-than-normal pixel precision and "difference clipping," is another unique approach utilized in an embodiment of temporal processing.

The temporal processing as disclosed so far appears to perform fairly well for video fields that have motion in them. To further reduce storage, motion detection may be used to eliminate the output and storage of difference fields that have no significant motion in them. Eliminating these fields may aid in the storage requirements for cameras with no motion in their field of view. In general, motion detection (S320) may be performed by a motion detector 224 by subtracting the current mallat block 39 and previous reconstructed mallat block 39 pixels and then comparing the results to an adjustable threshold number which may track whatever the current reciprocal bin width value is for that block. If any pixel values are over the motion sensitivity threshold, then motion may be indicated by setting a motion indicator. A motion mask 230 may be used to selectively specify which mallat block 39 pixels may be examined for motion sensitivity. The motion mask 230 may also have an independent motion sensitivity threshold for each pixel. When the motion indicator is set, then a retriggerable persistence timer 222 may be started. The persistence timer 222 may be set for one to two minutes; however, other times may also be desirable. When motion stops and the timer interval expires, then difference fields may cease to be processed or sent to storage. The persistence timer 222 may be necessary to make sure that video is not stalled when someone is in the field of view but holding very still. Further improvements may be possible such as including a larger mallat block in the field comparison step to aid in better detection of small amounts of motion, therefore making a much shorter persistence time possible.

Now referring to FIG. 3, a temporal processing flow diagram is shown. This processing may be performed by hardware such as a digital signal processing chip (DSP), software, or other equivalent means. The diagram provides a basic description of steps that may be included for temporal processing. An image from a video source such as a surveillance camera may be received at step S300 by a temporal compression interface 202 as per the present invention. The image may then be formatted at step S302 and input into a spatial compressor 204 and spatially compressed at step S304, generating an input field. The input field may be an encoded field from a wavelet chip and may have already been spatially compressed. The input field may then be parsed where mallat blocks 3 thru 41 may be extracted. At step S308 Huffman and run length decoding may be performed on blocks 3 through 41. A determination may then be made if the current field is at a key field interval or at a difference field interval at step S310.

If at step S310, it is determined that the current field is at a key field interval, then the current field may be processed as a key field at step S324. Otherwise, it may be determined that the current field is at a difference field interval and the current field may then be processed as a difference field at step S322.

A motion determination step may be performed at step S320 after the difference field processing at step S322. If it was determined that no motion over a predetermined threshold occurred or if the persistence timer 222 is not running, then processing may proceed to a process idling step S336. The process idling step may be used to synchronize the system for real-time operation; however, it may be set to null or eliminated completely if real-time synchronization is not required. For example, real-time synchronization may not be required if the temporal processing is being done as a post processing step.

If at the motion determination step S320 it was determined that motion did occur, or if processing was at the key field processing step, then processing may proceed to a data compression encoding step S326. The data compression encoding step S326 may use a data compression encoder 214 to generate data compressed image fields from the temporal processed image fields. This may be done by run-length and Huffman encoding on blocks 3 thru 41 (which may currently reside in the recompression buffer).

The compressed mallat blocks may now resemble a standard ADV601 encoded field. A data formatter 216 may now modify the encoded field. To achieve a smaller file size (especially for the difference fields) the standard mallat block delimiters may be replaced with byte counts. Also, "bin width" values may be eliminated from the difference fields since they may be redundant with key fields. This assembled final field may be stored in an output buffer. Header information may be added to the appropriate field header of the assembled field. Header information added may include but is not limited to time stamps, compression types, camera numbers, and field counts.

Next, the field may be outputted at step S334 as a compressed image sequence 250. In an embodiment of the present invention, a "field ready" signal going to an interface card may be activated to initiate a file output transfer. If the interface card does not respond in time to fully transfer the field before the next input field is due in from the spatial compressor, then the "field ready" signal may be de-asserted and the field may be stored in a field over-run buffer. Therefore, during the next field interval there may be two fields ready to transfer. If the field over-run buffer gets backed up to a certain memory threshold, then a throttling mechanism may kick in that starts to throw away fields until the condition clears. At step S334, field(s) may be transferred to the interface card when ready. This description, using an interface card may be used in some embodiments. Other embodiments may transfer the output fields internally or through other output mechanisms.

Step S336 allows the DSP (or other type processor) to idle while it waits for the next input field. This step is useful for real-time processing of images, and may be eliminated for non-real-time processing of images.

FIG. 4 shows multi-field temporal processing. Illustrated is a multiple field sequence starting with a key field. Block 400 expands upon step S324 and block 420 expands upon step S322.

If the current field was determined to be a key field at step S310, key field temporal processing 400 may be performed. The key field input may be in its decoded, quantized, and high precision form at 410. The following steps may be the first steps necessary to provide a reduction in noise as previously explained. Block 412 may clip the image field by dividing the image field using a clipping factor. Block 414 may now generate a higher precision image field by multiplying the clipped image field by a higher precision factor. In the presently illustrated embodiment, both the clipping factor and higher precision factor are 2; however, those skilled in the art will recognize that other values may be used for these factors, and that these factors may have different values. The higher precision image field may now be stored in the accumulation buffer 212 as the first accumulated field of an image sequence. This first accumulated field may later be used during the next field's differencing operation to build its own accumulated field.

Block 420 may process difference fields. At this point, the current field was preferably determined to be a difference field at step S310. In the presently illustrated embodiment, block 420 may process difference fields 2 through 224. Field 2 processing is shown in block 430, and field 3 processing is shown in block 450. The remaining fields are preferably processed iteratively in a similar manner. The current input field may be in its decoded, quantized, and high precision form at 432. Next, a difference field may be calculated at 434 by subtracting all of the pixels of the previous accumulated field from the current field's pixels. Block 434 may also compare each mallat block 39 difference pixel to a sensitivity threshold number to determine if motion has occurred. If any difference pixels are over the threshold then make a positive determination that motion has occurred. Once a determination that motion has occurred is made, then a persistence timer 222 may be started that will continue to retrigger for as long as motion is present. When motion stops and the timer expires, then difference fields no longer need to be sent out.

Subtracting the last field's accumulated pixel values from the current field's pixel values may help determine which pixels have significantly changed and which have not. Once this differencing is accomplished, then the resulting difference pixel values may be converted to normal bin width levels and clipped at 436 using a clipping factor and then output as a difference field 442. These resulting difference pixel values may also be used to build an accumulated image field for the next field's differencing operation. This accumulated image field may be formed by multiplying the clipped image field by a higher precision factor at 438 and then summing the higher precision image field with the last accumulated image field at block 440.

Figure 5:
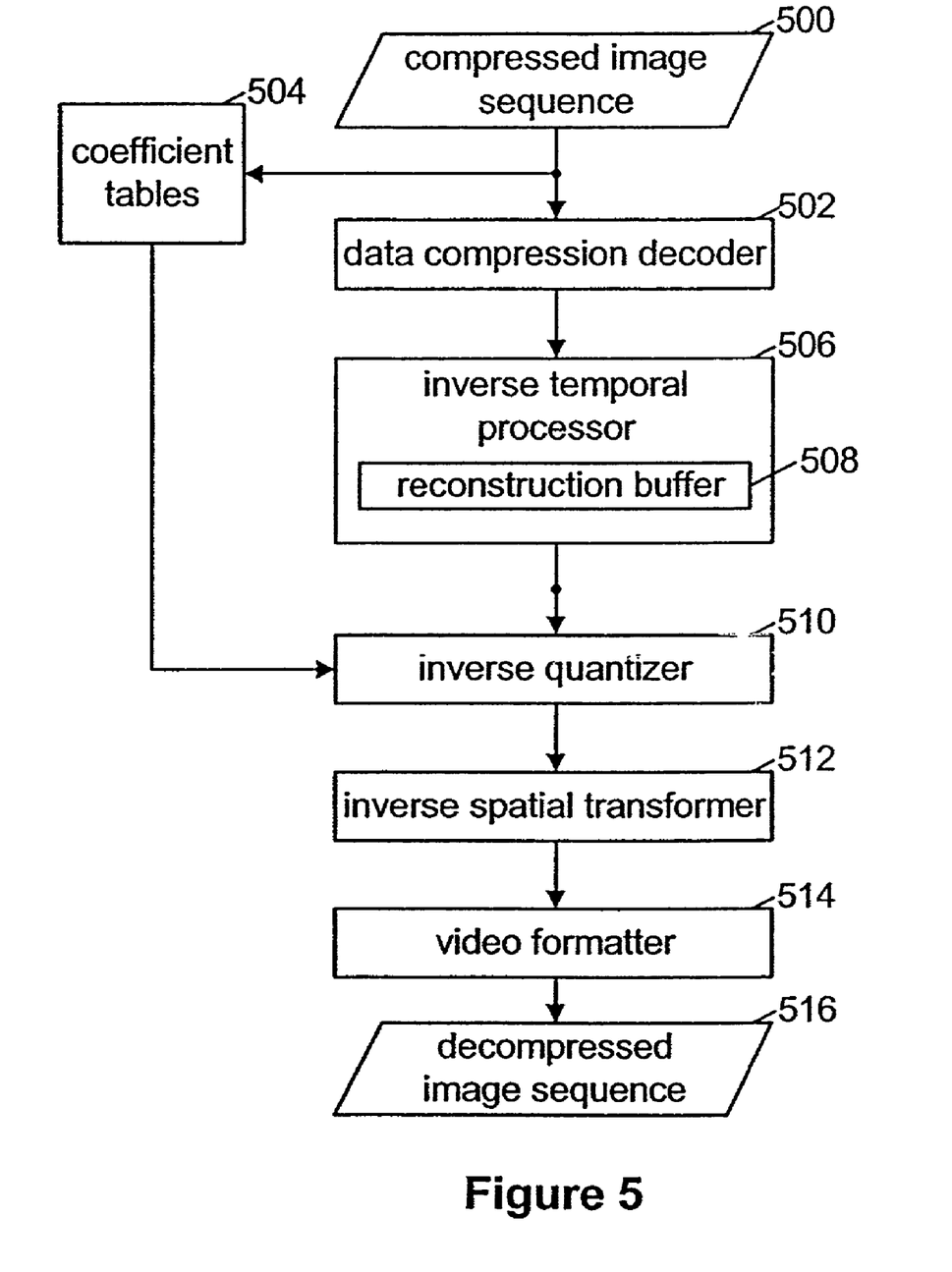
FIG. 5 is a block diagram of a temporal decompression apparatus as per an embodiment of the present invention.
Figure 6:
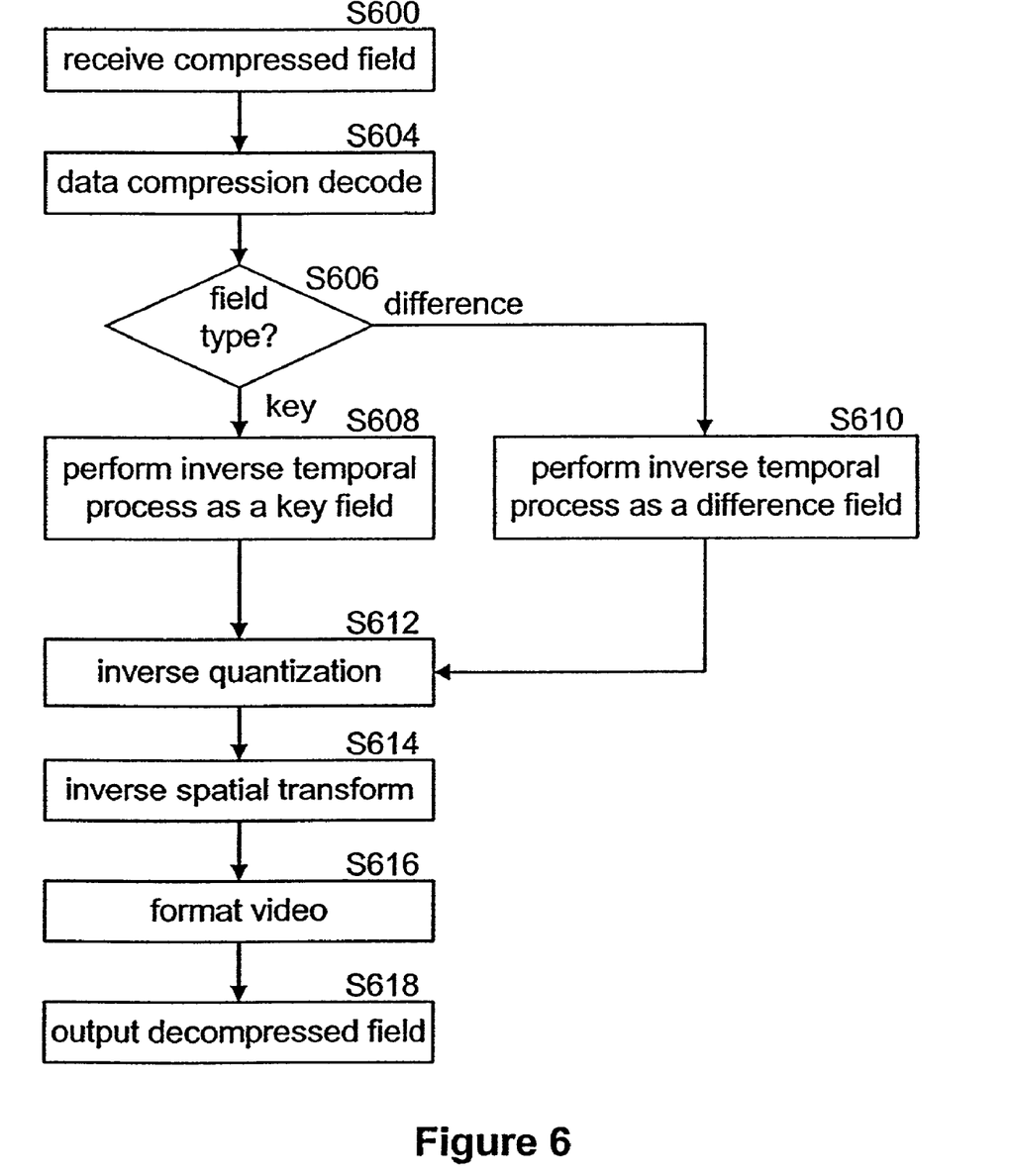
FIG. 6 is a flow diagram of temporal decompression as per an embodiment of the present invention.
Figure 7:
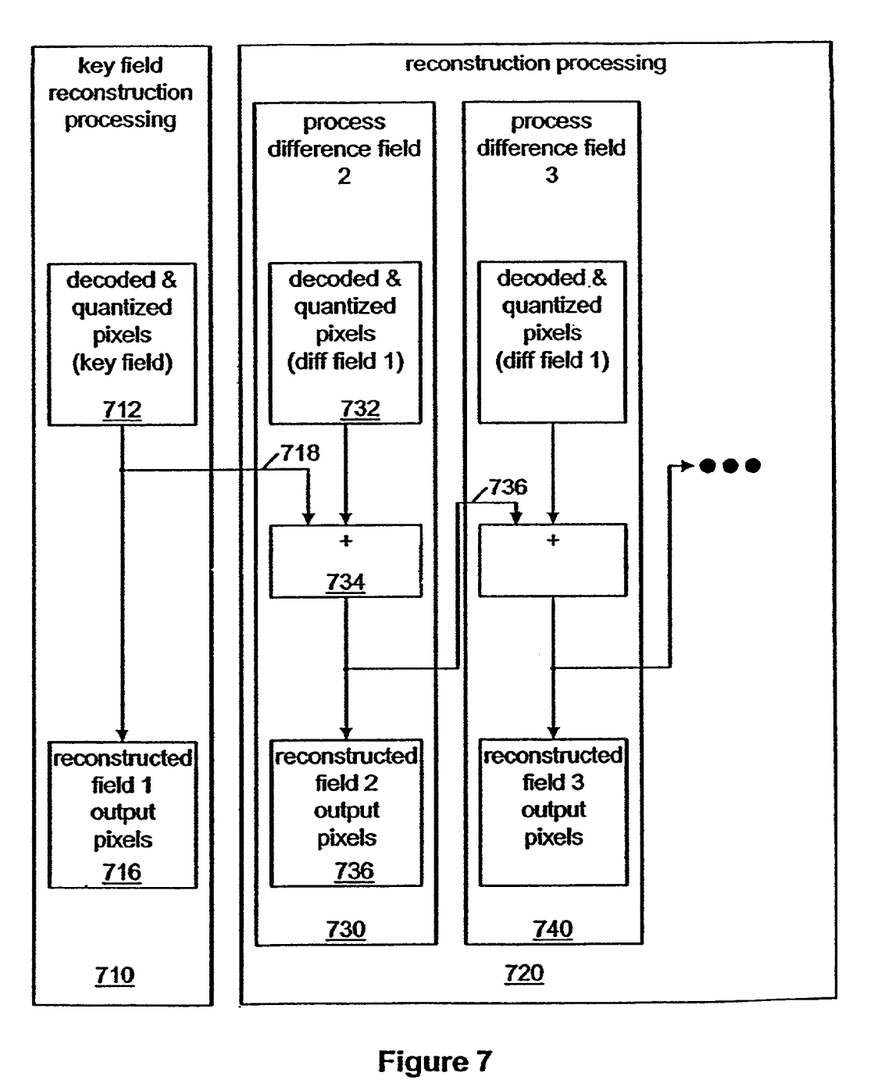
FIG. 7 is a block diagram of inverse temporal field reconstruction processing as per an embodiment of the present invention.

FIGS. 5, 6 and 7 show an embodiment of a temporal decompressor. FIG. 5 is a temporal decompression apparatus block diagram as per an embodiment of the present invention, FIG. 6 is a flow diagram of temporal decompression as per an embodiment of the present invention, and FIG. 7 is a block diagram of inverse temporal field reconstruction 5 processing as per an embodiment of the present invention.

Temporal decompression may primarily be used in two locations within a system: in a "spot monitor" channel to generate a local reconstructed image sequence, and in "GUI" (Graphical User Interface) software to perform the decompression in a workstation.

Block 500 is a sequence of temporally compressed fields. The source of the temporally compressed fields may be from a number of sources including a video compression channel (in the case of the "spot monitor" channel on the interface card), or mass storage (in the case of the GUI software in the workstation). Huffman and run length decoding may then be performed on mallat blocks 3 thru 41 by the data compression decoder 502. Then the inverse temporal processor 506 may then determine if the input field is a key field or a difference field by looking at the field header information. If the input field is a key field then the input field may just pass on to the inverse quantizer 510, and may also be saved as the first reconstructed field 508 of a one-minute sequence. This first reconstructed field 508 may be used during the next field cycle as a basis for the first difference field to build upon. If the input field is a difference field then simply add its pixel values to the pixel values of the previous reconstructed field 508 and pass the result on to the next step. These resulting pixel values are also stored as the reconstructed field 508 for the next difference field to build upon.

The inverse quantizer 510 may use coefficients from the coefficient tables 504 in the form of bin widths to generate inverse quantized image fields from the temporal reconstructed image fields. Then the inverse spatial transformer 512 may use an inverse wavelet function to generate inverse spatially transformed image fields from the inverse quantized image fields.

Now referring to FIG. 6, a temporal decompression flow diagram is shown. This processing may be performed by hardware such as a digital signal processing chip (DSP), software, or other equivalent means. The diagram provides a basic description of steps that may be included for inverse temporal processing. A compressed image from a compressed image sequence 500, compressed using a temporal compressor as per the present invention may be received at step S600. At step S604, data compression decoding is performed by a data compression decoder 502. The data compression decoding may need to be functionally capable of decoding the images encoded by the temporal compressor. In the illustrated embodiment, this may be run length and Huffman encoding on mallat blocks 3 thru 41. A determination may then be made if the current field is a key field or a difference field at step S606.

If at step S606 it is determined that the current field is a key field, then the current field may be processed as a key field at step S608. Otherwise, it may be determined that the current field is a difference field and the current field may then be processed as a difference field at step S610.

The field may then be inversely quantized S612 by an inverse quantizer 510. Next, the inverse quantized image field may be inverse spatially transformed S614 by an inverse spatial transformer 5512. In one embodiment of the present invention, these functions may be performed by the Analog Devices ADV601LC chip. In another embodiment, these steps may be performed directly in software without the use of an ADV601LC.

A video formatter 514 may now properly format the inverse spatially transformed image fields into a form necessary for graphical display. The result may be decompressed image fields 516.

FIG. 7 shows inverse temporal field reconstruction processing as per an embodiment of the present invention. Block 710 expands upon step S608 and block 720 expands upon step S610.

If the current field was determined to be a key field at step S608, key field reconstruction processing 710 may be performed. The key field input may be in its decoded and quantized form at 712. The reconstructed key image field may now be sent as an output 716 and stored in the reconstruction buffer 508 as the first reconstruction field of an image sequence. This first reconstruction field 718 may later be used during the next field's summing operation to build the next reconstruction field. Block 720 may process difference fields. At this point, the current field was preferably determined to be a difference field at step S606. In the presently illustrated embodiment, block 720 may process difference fields 2 through 224. Field 2 processing is shown in block 730, and field 3 processing is shown in block 740. The remaining fields are preferably processed iteratively in a similar manner. The compressed difference field #2 input may be in its decoded and quantized form at 732. Next, summing 734 the previous reconstructed key field 718 with the current decoded and quantized difference field 732 may generate a reconstructed difference field 736. This reconstructed difference field 736 may similarly be passed on to block 740 for difference field processing and so on, until all of the difference fields have been processed.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. For example, the present embodiment has been described using pixel resolutions supported by current network bandwidths, current processing power, and current storage capabilities. One skilled in the art will recognize that the present invention may be scaled to match varying requirements and systems. The illustrated embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus for temporal compression of a sequence of images comprising:
   (a) an interface for receiving said sequence of images;
   (b) a spatial compressor for generating spatially compressed image fields from said sequence of images;
   (c) a data compression decoder for generating data decompressed image fields from said spatially compressed image fields;
   (d) a temporal processor for generating temporally processed image fields from said data decompressed image fields, wherein said temporal processor iteratively generates a differenced image field by taking a difference between a current image field and an accumulated image field; generates a clipped image field by dividing said differenced image field by a clipping factor; generates a high precision image field by multiplying said clipped image field by a higher precision factor; and generates a new accumulated image field by summing said accumulated image field with said higher precision image field;
   (e) a data compression encoder for generating data compressed image fields from said temporal processed image fields; and
   (f) a data formatter for generating formatted compressed image fields from said data compressed image fields, wherein said formatted compressed image fields include key image fields and difference image fields.

2. The apparatus according to claim 1 wherein said sequence of images is a video signal.

3. The apparatus according to claim 2 wherein said video signal is an analog video signal and said interface digitizes said analog video signal.

4. The apparatus according to claim 2 wherein said video signal is a digital video signal and said interface formats said digital video signal.

5. The apparatus according to claim 1, further including a coefficient table for storing compression coefficients.

6. The apparatus according to claim 1, further including a motion mask.

7. The apparatus according to claim 1, further including an accumulation buffer for storing accumulated image fields.

8. The apparatus according to claim 1, wherein said temporal processor includes a persistence timer.

9. The apparatus according to claim 1, wherein said temporal processor further includes a motion detector.

10. A method for temporal compression of a sequence of images comprising:
   (a) receiving said sequence of images;
   (b) generating spatially compressed image fields from said sequence of images;
   (c) generating data decompressed image fields from said spatially compressed image fields;
   (d) generating temporal processed image fields from said data decompressed image fields, wherein said step of generating temporal processed image fields includes iteratively generating a differenced image field by taking a difference between a current image field and an accumulated image field; generating a clipped image field by dividing said differenced image field by a clipping factor; generating a higher precision image field by multiplying said clipped image field by a higher precision factor; and generating a new accumulated image field by summing said accumulated image field with said higher precision image field;
   (e) generating data compressed image fields from said temporal processed image fields; and
   (f) generating formatted compressed image fields from said temporal processed image fields, wherein said formatted compressed image fields include key image fields and difference image fields.

11. The method according to claim 10 wherein said sequence of images is a video signal.

12. The method according to claim 10 wherein said video signal is an analog video signal and said step of receiving said sequence of images further includes digitizing said analog video signal.

13. The method according to claim 10 wherein said video signal is a digital video signal and said step of receiving said sequence of images further includes formatting said digital video signal.

14. The method according to claim 10, further including storing compression coefficients in a coefficient table.

15. The method according to claim 10, wherein said step of generating temporal processed image fields from said data decompressed image fields includes using a motion mask.

16. The method according to claim 10, wherein said step of generating temporal processed image fields from said data decompressed image fields further includes storing accumulated image fields in an accumulation buffer.

17. The method according to claim 10, wherein said step of generating temporal processed image fields from said data decompressed image fields further includes the step of determining motion.

18. The method according to claim 17, wherein said step of determining motion further includes the step of starting a persistence timer if motion is detected.

19. A method of compressing image data from a video camera that generates a plurality of images, comprising the steps of:
   (1) performing a wavelet transformation on each of the plurality of images and producing wavelet transformed image data;
   (2) generating a temporally processed sequence of image frames from the wavelet transformed image data, including the step of clipping pixel values in each image frame;
   (3) generating a data compressed sequence of image frames from the temporally processed sequence of image frames; and
   (4) storing the results of step (3) in a storage device, wherein step (2) includes the step of detecting motion between one or more image frames and, in response to determining that no motion has been detected, inhibiting storage of temporally processed image frames, wherein step (2) comprises the steps of iteratively generating a differenced image field by taking a difference between a current image field and an accumulated image field: generating a clipped image field by dividing said differenced image field by a clipping factor: generating a high precision image field by multiplying said clipped image field by a higher precision factor: and generating a new accumulated image field by summing said accumulated image field with said higher precision image field.

20. The method of claim 19, wherein step (2) includes the step of storing difference frames for a predetermined period of time after no more motion has been detected.

21. The method of claim 19, wherein step (3) comprises the step of generating the data compressed sequence by performing run-length encoding and Huffman encoding on difference frames.

22. The method of claim 19, wherein step (4) comprises the step of storing only odd fields or even fields of a multi-field interlaced camera image.

23. The method of claim 19, wherein step (2) comprises the step of performing a divide, truncate, and multiply operation on pixel values.

24. The method of claim 19, wherein step (2) comprises the step of detecting motion over only a masked portion of an image frame.

25. The method of claim 19, further comprising the step of discarding three or more mallat blocks from each frame of the wavelet transformed image data.

26. The method of claim 19, wherein step (2) comprises the step of subtracting pixel values of a single current mallat block from pixel values of a single previous mallat block and comparing the results to a threshold.

27. The method of claim 19, wherein step (1) includes the step of performing run-length encoding and Huffman encoding on the wavelet transformed image data, and wherein step (2) comprises the step of performing reverse run-length encoding and reverse Huffman encoding on the wavelet transformed image data.

28. The method of claim 19, wherein step (2) is performed only on mallat blocks 3 through 41 of the wavelet-transformed image data.

29. A method of compressing image data from a video camera that generates a plurality of images, comprising the steps of:
(1) performing a wavelet transformation on each of the plurality of images and producing wavelet transformed image data;
(2) generating a temporally processed sequence of image frames from the wavelet transformed image data, including the step of clipping pixel values;
(3) generating a data compressed sequence of image frames from the temporally processed sequence of image frames; and
(4) storing the results of step (3) in a storage device, wherein step (2) includes the step of detecting motion between one or more image frames and, in response to determining that no motion has been detected, inhibiting storage of temporally processed image frames, and, wherein step (2) comprises the steps of:
(a) periodically storing clipped pixel values in a key field representing a complete image frame;
(b) subtracting pixel values from a next image frame from the pixel values in the key field to form a subtracted image frame;
(c) clipping pixel values in the subtracted image frame; and
(d) adding a higher precision version of the result of step (c) to the pixel values in step (a).

30. The method of claim 29 wherein step (2) comprises the step of performing a difference operation between a reconstructed previous image field and a high precision pixel value of a current field, then clipping the result of the difference operation.

31. A method of operating a system comprising a camera generating a sequence of video images, the method comprising the steps of:
(1) receiving a sequence of video images from the camera;
(2) performing a wavelet transformation on the sequence of video images and producing a sequence of wavelet transformed images;
(3) for the sequence of wavelet transformed images, detecting whether motion has occurred between successive video images; and
(4) in response to detecting motion in step (3), storing a temporally processed and data compressed version of the wavelet transformed images and otherwise inhibiting such storage, wherein step (4) comprises the step of subtracting successive wavelet transformed image frames; clipping pixel values in the resulting image frame; and adding the clipped pixel values to a previously processed image frame.

32. The method of claim 31, wherein step (4) comprises the step of storing the temporally processed and data compressed version for a predetermined period of time after no more motion is detected.

33. The method of claim 31, wherein step (3) comprises the step of subtracting pixel values for a corresponding mallat block in two successive images and comparing the result to a threshold.

34. The method of claim 31, wherein step (4) comprises the step of performing run-length encoding and Huffman encoding on difference frames of pixel data.

35. The method of claim 31, wherein step (4) comprises the steps of generating a differenced image field by taking a difference between a current image field and an accumulated image field; generating a clipped image field by dividing said differenced image field by a clipping factor; generating a high precision image field by multiplying said clipped image field by a higher precision factor; and generating a new accumulated image field by summing said accumulated image field with said higher precision image field.

36. Apparatus for compressing image data from a video camera that generates a plurality of images, comprising:
a processor that generates a wavelet transformed version of each of the plurality of images;
a temporal processor that operates on the wavelet transformed version of each of the plurality of images, the temporal processor comprising a motion detector that detects motion between frames; a difference field processor that produces difference frames having clipped pixel values; and an accumulation buffer that stores clipped difference frames when motion is detected by the motion detector; and
a data compression encoder that compresses the data stored in the accumulation buffer, wherein the temporal processor performs steps of generating a differenced image field by taking a difference between a current image field and an accumulated image field; generating a clipped image field by dividing said differenced image field by a clipping factor; generating a high precision image field by multiplying said clipped image field by a higher precision factor; and generating a new accumulated image field by summing said accumulated image field with said higher precision image field.

37. The apparatus of claim 36, wherein the temporal processor further comprises a persistence timer that causes difference frames to be stored for a period of time after no more motion has been detected.

38. The apparatus of claim 36, wherein the motion detector detects motion over a masked area of each image frame.

39. The apparatus of claim 36, wherein the temporal processor periodically stores a complete image frame as a key field and thereafter stores only difference frames.

40. The apparatus of claim 36, wherein the data compression encoder performs run-length and Huffman encoding on the data stored in the accumulation buffer.

41. A method of compressing image data comprising a sequence of images, comprising the steps of:
   (1) performing a wavelet transformation on the sequence of images and producing wavelet transformed image data;
   (2) generating a temporally processed sequence of image frames from the wavelet transformed image data, including the step of clipping pixel values to reduce noise in the image frames;
   (3) generating a data compressed sequence of image frames from the temporally processed sequence of image frames; and
   (4) storing the results of step (3) in a storage devices, wherein step (2) comprises the step of subtracting two image frames and clipping pixel values in the resulting subtracted image frame, and wherein step (2) comprises the further step of adding a precision-adjusted version of the clipped pixel values to a previously processed image frame.

42. The method of claim 41, further comprising the step of discarding mallat blocks from the wavelet transformed image data.

43. The method of claim 41, wherein step (2) comprises the step of clipping pixel values from an image frame and subtracting the clipped pixel values from a clipped version of an earlier image frame.

44. The method of claim 43, wherein step (2) comprises the step of dividing each pixel value by a first precision factor, truncating each pixel value, and multiplying each pixel value by a second precision factor.

45. The method of claim 41, wherein step (2) comprises the step of periodically storing a complete image frame as a key field, and thereafter storing only difference image frames.

46. The method of claim 45, further comprising the step of decompressing the compressed image data by reconstructing image frames from stored key fields and difference image frames.

* * * * *